(12) United States Patent
Sun et al.

(10) Patent No.: US 11,223,642 B2
(45) Date of Patent: Jan. 11, 2022

(54) ASSESSING TECHNICAL RISK IN INFORMATION TECHNOLOGY SERVICE MANAGEMENT USING VISUAL PATTERN RECOGNITION

(71) Applicant: INTERNATIONAL BUSINESS MACHINES CORPORATION, Armonk, NY (US)

(72) Inventors: Hongtan Sun, Armonk, NY (US); Larisa Shwartz, Greenwich, CT (US); Rohit Madhukar Khandekar, Jersey City, NJ (US); Qing Wang, Ossining, NY (US); Bing Zhou, Port Jefferson Station, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 340 days.

(21) Appl. No.: 16/571,088

(22) Filed: Sep. 14, 2019

(65) Prior Publication Data
US 2021/0084059 A1    Mar. 18, 2021

(51) Int. Cl.
*H04L 9/00*    (2006.01)
*H04L 29/06*   (2006.01)
(Continued)

(52) U.S. Cl.
CPC ...... *H04L 63/1425* (2013.01); *G06F 16/9024* (2019.01); *G06N 3/08* (2013.01);
(Continued)

(58) Field of Classification Search
CPC .......... H04L 63/1425; H04L 63/1416; H04L 63/1433; H04L 43/045; H04L 2463/121;
(Continued)

(56) References Cited

U.S. PATENT DOCUMENTS 6,522,768 B1    2/2003  Dekhil et al.
10,572,837 B2*  2/2020  Chu ..................... G06Q 10/063
(Continued)

OTHER PUBLICATIONS

Anonymous, "System and Method for Predicting and Preventing Incidents with IT Service Management Platforms"; IP.com No. IPCOM000253179D; (2018); 5 pgs.
(Continued)

*Primary Examiner* — Beemnet W Dada
(74) *Attorney, Agent, or Firm* — Intelletek Law Group, PLLC; Gabriel Daniel, Esq.

(57) ABSTRACT

A computer system, non-transitory computer storage medium, and a computer-implemented method of assessing technical risk using visual pattern recognition in an Information Technology (IT) Service Management System. A data visualization engine and a time series generation engine receive the operational data, respectively. A first representation of the data is generated by the data visualization engine, and a second representation of the data is generated by the time series generation engine. Anomaly patterns are identified by a pattern recognition engine configured to perform feature extraction and data transformation. An ensembler is configured to accept the outputs from two AI anomaly engines and make a final decision of whether anomaly patterns are captured. Risk scores based on the identified anomaly patterns are output by a pattern recognition engine to an automated management system. The anomalies includes information regarding vulnerabilities of devices or components of the IT Service Management System.

20 Claims, 13 Drawing Sheets

(51) Int. Cl.
*G06F 16/901* (2019.01)
*H04L 12/26* (2006.01)
*G06N 3/08* (2006.01)

(52) U.S. Cl.
CPC ........ *H04L 43/045* (2013.01); *H04L 63/1416* (2013.01); *H04L 63/1433* (2013.01); *H04L 2463/121* (2013.01)

(58) Field of Classification Search
CPC ............. H04L 43/0817; H04L 43/0888; H04L 41/142; H04L 41/16; G06F 16/9024; G06N 3/08; G06N 3/0454; G06N 3/0445; G06Q 10/0635
See application file for complete search history.

(56) References Cited

U.S. PATENT DOCUMENTS

| | | | |
|---|---|---|---|
| 2011/0078106 A1 | 3/2011 | Luchi et al. | |
| 2012/0041575 A1* | 2/2012 | Maeda | G05B 23/024 700/80 |
| 2015/0156213 A1 | 6/2015 | Baker | |
| 2015/0281287 A1 | 10/2015 | Gill et al. | |
| 2016/0299776 A1 | 10/2016 | Richards et al. | |
| 2017/0063905 A1 | 3/2017 | Muddu et al. | |
| 2018/0295154 A1* | 10/2018 | Crabtree | G06N 20/00 |
| 2019/0004923 A1* | 1/2019 | Ariga | G06F 11/3419 |
| 2020/0035001 A1* | 1/2020 | Pang | G06F 16/2477 |

OTHER PUBLICATIONS

IBM, et al., "Time series analysis—Semi-Automated Selection of Arima Model type and Parameters"; IP.com No. IPCOM000154702D (2007); 8 pgs.

Mell, P. et al., "Recommendations of the National Institute of Standards and Technology"; NIST Special Publication 800-145 (2011); 7 pgs.

Abdel-Hamid, O. et al., "Convolutional Neural Networks for Speech Recognition"; IEEE/ACM Transactions on Audio, Speech, and Language Processing (2014); vol. 22:10, pp. 1533-1545.

* cited by examiner

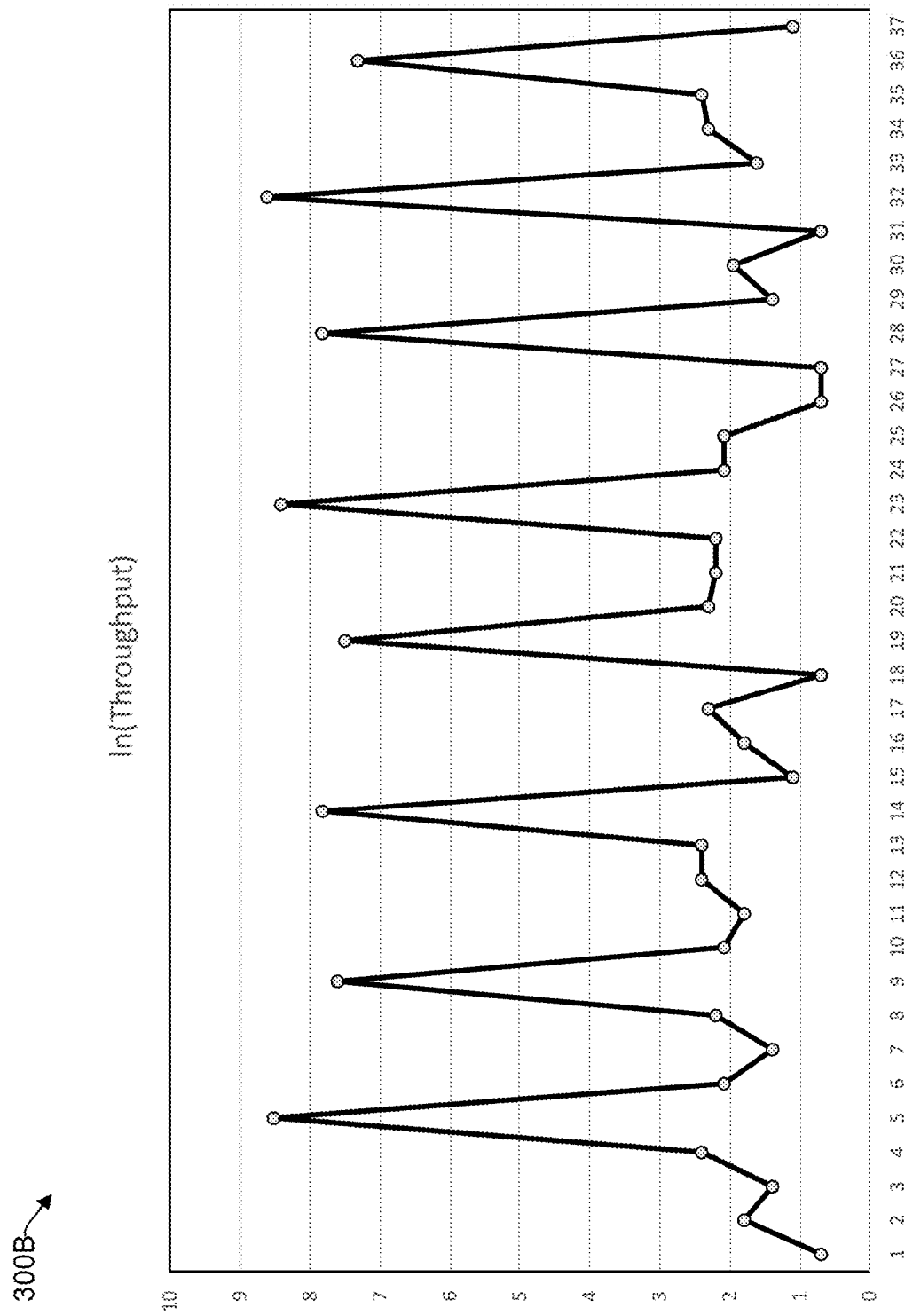

ASSESSING TECHNICAL RISK IN INFORMATION TECHNOLOGY SERVICE MANAGEMENT USING VISUAL PATTERN RECOGNITION

BACKGROUND

Technical Field

The present disclosure generally relates to risk assessment in computer operations and technical services. More particularly, the present disclosure relates to the application of pattern recognition to assess technical risks in Information Technology (IT) service management.

Description of the Related Art

Today, IT systems are part of the backbone of operations in a growing number of fields. As a result, there is an increased emphasis in risk assessment of failures or incidents in an IT service system that can adversely impact operations and running processes. In a non-limiting example, risk assessment in IT service management may be performed regarding server availability, storage capacity, or other vulnerabilities.

SUMMARY

According to various embodiments, a computing system, a non-transitory computer readable storage medium, and a method are provided to assess technical risk in an IT service management system using visual pattern recognition and artificial intelligence (AI). The use of visual pattern recognition according to the present disclosure is applicable across domains other than IT service management.

According to an embodiment, a computing system includes a processor and a plurality of engines. The plurality of engines is configured to perform acts, including receiving an operational data of a system being monitored by a data visualization engine and a time series generation engine. The operational data is processed by the data visualization engine to create a first representation of the operational data. The operational data is also processed by the time series generation engine to create a second representation of the operational data. An AI component of the pattern recognition engine receives the first representation of the operational data and the second representation of the operational data, and performs feature extraction and data transformation on the respective first representation of the operational data and the second representation of the operational data. The first representation of the operational data and the second representation of the operational data are scanned to identify respective anomaly patterns by the first AI anomaly identification engine and the second AI anomaly identification engine respectively. An ensembler is configured to render a decision as to whether the identified anomaly patterns in the first representation of the operational data and the second representation of the operational data are associated with vulnerabilities of devices or components in the system being monitored. The decision rendered by the ensembler is output to an output node.

In one embodiment, the pattern recognition engine includes at least two artificial intelligence (AI) engines.

A first AI anomaly engine includes a convolutional neural network (CNN) system configured to identify anomaly patterns of the visualized operational data generated by the data visualization engine. A second AI anomaly engine includes a Long Short-Term Memory (LS™) model configured to identify anomaly patterns from the time series data generated by the time series generation engine. The ensembler is configured to receive outputs of the first AI anomaly engine and the second AI anomaly engine.

In one embodiment, the pattern recognition of anomalies of the operational data processed by the data visualization engine and the time series generation engine are output to an Information Technology (IT) service management system. The anomalies are vulnerabilities of devices or components in the IT service management system.

In one embodiment, the pattern recognition engine performs the data transformation by at least one of a Fast Fourier Transform, binning, or normalization. In one embodiment, a machine learning model is created by the computing device during a training phase, in which the computing device is configured to analyze historical patterns of analytical visual charts generated by the data visualization engine; and to analyze historical patterns of time series data generated by the time series generation engine. The machine learning model is further configured to label historical patterns of analytical visual charts and historical patterns of time series data as being anomalies according to predetermined criteria.

According to one embodiment, a non-transitory computer readable storage medium tangibly embodying a computer readable program code having computer readable instructions that, when executed, causes a computer device to carry out a method of assessing technical risk using visual pattern recognition and pattern recognition of time series data. The method includes the operations of processing a same operational data of a system being monitored by a data visualization engine and a time series generation engine, respectively, to create two representations from the operational data. The data visualization engine generates a first representation of the operational data comprising analytical visual charts including visualized operational data. The time series generation engine generates a second representation of the operational data comprising patterns of time series data.

A pattern recognition engine identifies anomaly patterns in the first representation of the operational data and the second representation of the operational data, respectively. A decision is rendered as to whether the identified respective anomaly patterns in the first representation of the operational data and the second representation of the operational data are associated with vulnerabilities of devices or components in the system being monitored. The decision is output to an output node.

In one embodiment, the assessing of technical risk using visual pattern recognition is performed on an Information Technology (IT) service management system.

In one embodiment, a computer-implemented method of risk assessment utilizing visual pattern recognition includes receiving the same operational data by a data visualization engine and a time series generation engine. The data visualization engine generates visual analytic charts of the operational data, and the time series generation engine generates a time series representation of the same operational data. A pattern recognition engine performs feature extraction and data transformation on the visual analytic charts and the time series representation of the operational data. A first Artificial Intelligence (AI) engine includes a convolutional neural network system, and identifies anomaly patterns from the visualized analytic charts. A second AI anomaly engine including a Long Short-Term Memory (LSTM) model and identifies anomaly patterns from the time series representation of the operational data.

An ensembler receives outputs of the first AI anomaly engine and the second AI anomaly engine and renders a decision as to whether the outputs of the first AI anomaly engine and the second AI anomaly engine comprise anomaly patterns associated with vulnerabilities of device or components in a system being monitored. The risk assessment engine that receives the decision from the ensembler as to whether the outputs of the first AI anomaly engine and the second AI anomaly engine includes anomaly patterns, and outputs risk scores that identify vulnerabilities of devices or components in an Information Technology service management system. The risk scores can be output to a user interface (UI).

In one embodiment, the performing of feature extraction and data transformation on the visual analytic data and the time series data includes performing at least one of a dimensionality reduction, a Fast Fourier Transformation on time series data, or a calculating of a natural logarithm of the operational data.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead of the illustrated embodiments herein. Details that may be apparent or unnecessary may be omitted to save space or for more effective illustration. Some embodiments may be practiced with additional components, operations and/or without all the components or operations that are illustrated. When the same numeral appears in different drawings, it refers to the same or like components or steps.

FIGS. 3A and 3B are images of periodic peaks for network throughput generated by a data visualization engine that utilizes a natural logarithm of time series data generated by the time series generation engine, consistent with an illustrative embodiment.

DETAILED DESCRIPTION

Overview

Figure 1:
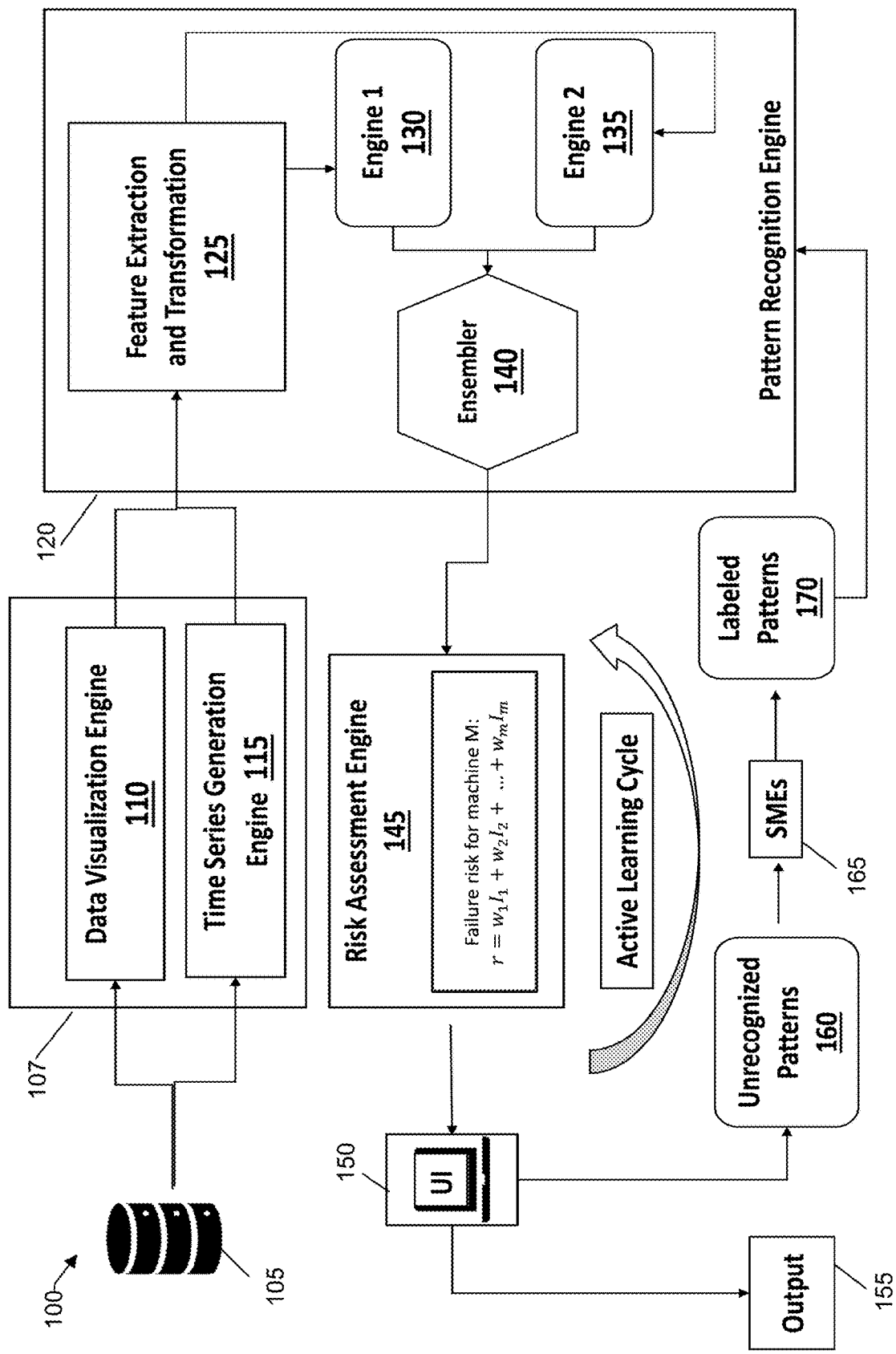
FIG. 1 illustrates an example architecture of a computing system configured to assess technical risk, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, a risk assessment system in IT management may include one or more processors, and one or more storage devices coupled to the one or more processors. Through the use of two different engines (e.g., a data visualization engine and a time series engine) operational data is analyzed for different types of anomalies to assess a technical risk of failure. The two different engines create two representations of the same operational data. For example, a data visualization engine generates visual charts based on the operational data, while a time series generation engine generates time series data that is based on the same operational data used to generate the visual charts. A pattern recognition engine includes a feature extraction and transformation engine that extracts and transforms the operational data received from the data visualization engine and the time series engine. Two Artificial Intelligence (AI) engines respectively identify anomaly patterns or normal operational data in the transformed visualization data or the transformed time series data. An ensembler renders a final decision as to whether the outputs of the two AI engines are anomaly patterns. The ensembler, in one embodiment, includes algorithms that perform machine learning techniques that may improve accuracy of predictions, and outputs the anomaly patterns to a risk assessment engine to generate risk scores that are provided to a User Interface (UI). The ensembler may perform a voting operation regarding anomaly patterns received from more than one engine or view of operational data. In such a case, a training data subset may be utilized for training various classifiers of a same type. The classifiers may be combine by a majority vote of the classifier decisions. Thus, the particular class that is identified by a largest number of classifiers can be the (final) decision by the ensembler.

By virtue of the concepts discussed herein, some aspects of the present disclosure provide for a more accurate operation to automatically assess technical risk in real time utilizing operational data that is processed using capabilities of both time series and visual analytical charts to identify anomalies associated with high risk systems in IT service management from two representations of the same operational data. In addition, embodiments of the present disclosure provide for an improved computer operation as a more efficient training of risk assessment models based on the at least two representations of the same operational data creates a more accurate machine learning model with fewer iterations that reduces processing overhead, saves power, and conserves processing use.

Example Architecture

FIG. 1 illustrates an example architecture 100 of a computing system configured to assess technical risk consistent with an illustrative embodiment. In an illustrative embodiment, the computing system is an IT service management system, and risk assessment is performed in real time utilizing operational data. For example, an IT service management system having the example architecture 100 shown in FIG. 1 can provide proactive issue prediction in addition to, or place of, reactive monitoring. However, it is to be understood that the teachings of the present disclosure and the practice of the appended claims are not limited to IT service management and can be applied across other domains.

A database 105 stores operational data regarding, for example, CPU usage, memory usage, incident tickets, user requests, automatically generated requests, etc. In one example, the CPU usage and memory usage can be expressed as overall percentages of use relative to capacity. In another example, incident tickets can include information regarding failed operations performed in response to user requests or automated requests. An ongoing history of successful operations may also be stored in the database 105. The aforementioned items, as well as other types of data associated with the operation of a computing system (e.g., number of retries), may constitute categories of raw data that can be analyzed to provide analytical information to identify issues (e.g., issue detection). In an illustrative embodiment, the issue detection can include identifying the most vulnerable (e.g., at risk) devices and/or components in the IT service management system according to predetermined criterion of the analysis of the raw data.

With continued reference to FIG. 1, a plurality of engines 107 including a data visualization engine 110 and a time series generation engine 115 both receive at least some of the operational data stored in database 105. The operational data received by both the data visualization engine 110 and time series generation engine 115, respectively, is the same operational data.

The data visualization engine 110 processes the operational data from database 105 to provide visual analytical charts based on the analysis performed. For example, the visual analytical charts may include line charts produced from analyzing CPU usage at predetermined intervals over a date range. In another example, the visual charts may include a histogram including a distribution of various incident tickets (e.g., server related incident tickets, network related tickets).

The time series generation engine 115 processes the operational data from database 105 in a time space over a series of time (as opposed to, for example, a simple snapshot) to provide a sequence of numbers for various categories of data operational data. The time series generation engine 115 generates a time series representation of the data.

In an illustrative embodiment, the visualization engine 110 and the time series generation engine 115 process the same operational data at substantially the same time. Accordingly, two representations of the same operational data are generated (e.g., analytical charts and time series representation).

The pattern recognition engine 120 receives the two representations of the operational data from the data visualization engine 110 and the time series generation engine 115. The pattern recognition engine 120 captures anomaly behavior patterns by analyzing the two representations.

The pattern recognition engine 120 includes a feature extraction and transformation engine 125 that extracts features from the visual analytical chart(s) provided from the data visualization engine 110. The feature extraction and transformation engine 125 then transforms information in the visual analytic charts from a time domain to a frequency domain, for example, by a Fast-Fourier transformation. Certain predetermined features, which may be peaks of a predetermined duration, may be considered key features for extraction.

In addition, the feature extraction and transformation engine 125 extracts features from the time series representation of the data, and then, for example, using a natural log transformation, transforms the time series data to a new time series data in the natural log format.

The pattern recognition includes at least two anomaly AI engines 130, 135 that may receive the transformed information from the feature extraction and transformation engine 125. The anomaly AI engines 130, 135 can respectively process the transformed data extracted from feature extraction and transformation engine 125.

For example, the first anomaly AI engine 130 can be embodied as a Convolutional Neural Network (CNN) pattern recognition engine. The first anomaly AI engine 130 is configured to capture anomaly patterns of the transformed visual analytic charts.

The second AI anomaly engine 135 can be embodied as a long short-term memory pattern recognition engine that processes the new time series data output from the feature extraction and transformation engine 125. The second AI anomaly engine 135 is configured to capture anomaly patterns of the transformed time series data (e.g., the new time series data that has undergone a natural log transformation as discussed hereinabove).

The ensembler 140 receives the output of the first AI anomaly engine 130 and the second AI anomaly engine 135. In an illustrative embodiment, the ensembler 140 may be realized as a voting engine. The ensembler 140 analyzes the outputs of the first AI anomaly engine 130 and the second AI anomaly engine 135 and renders a decision regarding the respective anomaly pattern identifications detected by the first AI anomaly engine 130 and the second AI anomaly engine 135. The ensembler 140 renders the final decision because the AI anomaly engines may provide anomaly pattern information that is different, or even partially contradictory. For example, the first AI anomaly engine 130 may output information indicating no anomaly patterns were captured from the transformed visual analytic chart(s), whereas the second AI anomaly engine 135 may output captured anomaly patterns. The ensembler 140 renders the final decision as to whether outputs of the first anomaly 130 and the second AI engine 135 comprise anomaly patterns or normal operation based on, for example, at least one of voting or an average. (Is the output of the Feature Extraction and Transformation engine 125 provided to Ensembler 140 as an input? If yes, will you provide a description of why and how is that used? If no, FIG. 1 suggests that is the case.)

With continued reference to FIG. 1, the risk assessment engine 145 is configured, for example, to assess the failure risk for a certain device or component in the computing system. The risk assessment engine 145 may generate risk scores based on the anomaly pattern information received from the ensembler 140. In an illustrative embodiment, the risk assessment engine 145 may receive performance indicators for a given machine/system "M" that have anomalies $I_1, I_2, I_3 \ldots I_m$. The risk assessment engine 145 may assess the failure risk "r" for machine M as follows:

$$r = w_1I_1 + w_2I_2 + \ldots + w_mI_m \quad \text{(Eq. 1)}$$

wherein:

$I_1, I_2, I_3 \ldots I_m$ are anomalies of machine M, and $w_1, w_2 \ldots w_m$ are weights assigned to the respective anomalies.

Referring to Eq. 1 above, each of the different anomalies (e.g., CPU utilization, storage utilization, retry operations, etc.,) are predefined and may be associated with a particular identifier ($I_1, I_2$), and a weight is assigned to each predefined anomaly regarding the likelihood of a decrease in performance or a failure of a machine M. In this illustrative embodiment, the risk calculated by the risk assessment engine 145 is a weighted sum of all the determined anomalies.

The risk assessment engine outputs the calculated risk assessment to the User Interface (UI) 150. The UI 150 can be communicatively coupled to a server configured to perform IT service management. The UI 150 can be configured to undertake corrective operations associated with various risks (e.g., reschedule a time of certain operations due to high CPU utilization or storage use) and/or may provide a notification (output node 155) to notify certain users (e.g., supervisors) about the risk assessment. The risk assessment may be in the form of a score, and depending on the risk score, the UI 150 may be coupled to a number of users that receive notification of the risk score. The manner of the notification can be realized in the form of a message, alarm, etc.).

The output node 155 may be operatively coupled to an automated management system, for example, an IT Server Management System. The output node 155 can receive commands/instructions from the IT Server Management System that is forwarded to the UI 150 for execution. The commands/instructions can be actions to preempt an operational failure by shifting certain operations to other devices or components because the risk score can be associated with vulnerabilities of currently used devices or components.

It is to be understood that the aforementioned description with reference to FIG. 1 is directed to an active phase of a system operation and computer-implemented method of assessing technical risk of the present disclosure. As seen in FIG. 1, there is also an active learning cycle (i.e., a training phase) in which, for example, historical data may be provided to train the machine. For example, during the training phase, the risk assessment engine may receive unrecognized patterns, and those patterns can be labeled by a Subject Matter Expert (SME) 165 and provided to the pattern recognition engine 120 as labeled patterns 170.

The labeled patterns 170 enhance the operation of the risk assignment engine 145 to assign a weight to the labeled patterns so that the failure risk can be accurately calculated. For example, assuming a weight scale from 0 to 1.0 correlating to failures ranging from temporary errors to catastrophic failures, the SME can assign a weight to the retries of writing data to storage at 0.2 if it is below a certain threshold, and increase the weight to 0.4 if over the threshold by an amount determined by the knowledge of the SME. The labeling of CPU-related anomalies may have a weight, for example, of 0.8, as there may be an increased risk of a catastrophic failure with CPU anomalies. In some embodiments, there can be one or more SMEs 165 realized as an automated program in which historical data is analyzed to assign weights to the unrecognized patterns 160. For example, unrecognized patterns of anomalies regarding CPU usage can be compared with labeling data of recognized patterns of CPU usage and an extrapolation performed to create a label for the unrecognized patterns.

It is to be understood that the concepts of the present disclosure are broader than the illustrative embodiments discussed herein. For example, the pattern recognition engine 120 shown in FIG. 1 may have more than two AI anomaly engines. In addition, the AI anomaly engines 130, 135 can be configured to process the transformed data received from the feature extraction and transformation engine 125 in different manners than disclosed in the embodiment herein above.

Figure 2A:
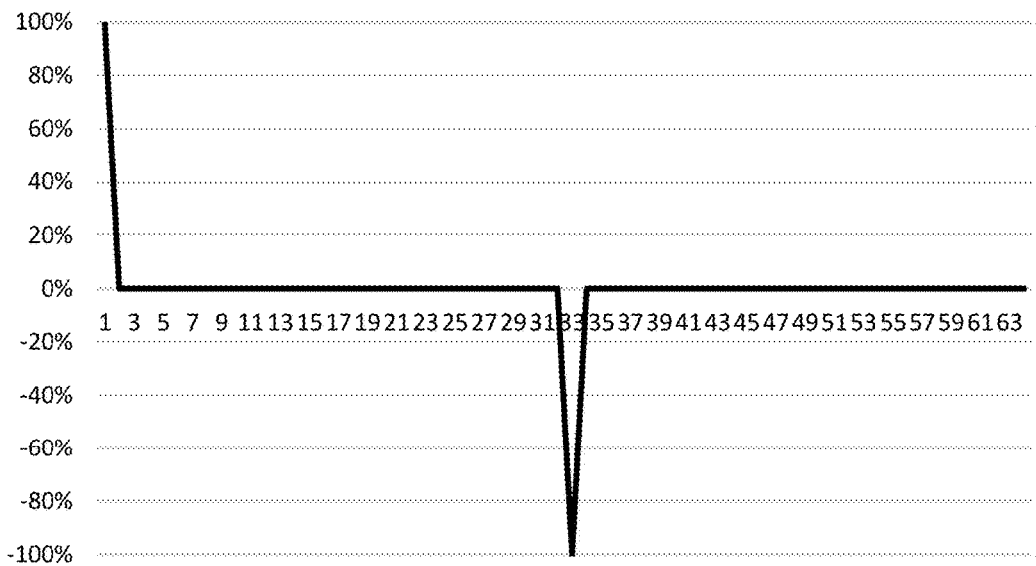
FIGS. 2A and 2B are graphical representations of CPU usage by a data visualization engine utilizing a Fast Fourier Transformation, consistent with an illustrative embodiment.
Figure 2B:
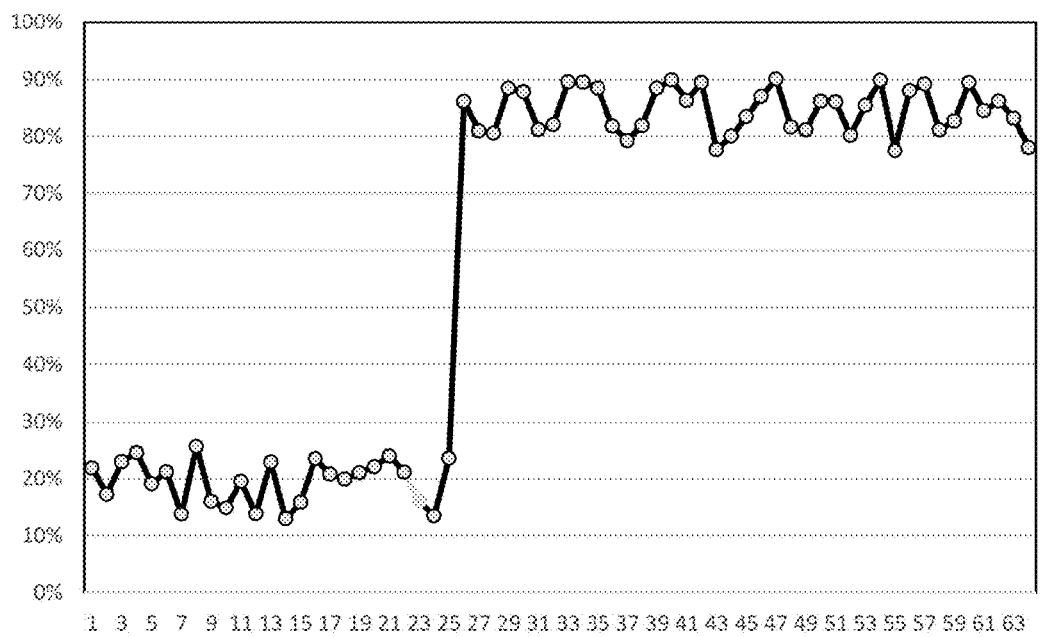

FIGS. 2A and 2B illustrate a graphical representation of an output of the Data Visualization Engine 110, in accordance with an illustrative embodiment. FIG. 2A shows the CPU usage as a stacked percentile after performing a Fast Fourier Transformation, and FIG. 2B shows the CPU usage peaks. Visualization data in the form of analytic charts such as shown in FIGS. 2A and 2B are provided to the feature extraction and transformation module 125 for processing, and is output to the AI anomaly Engine 130. The Fast Fourier Transform is utilized to generate images in the frequency space. The use of the Fast Fourier Transform separates the system behavior from data noise. For example, referring to FIGS. 2A and 2B, the low frequency data is from the system behavior while high frequency data is from data noise. In this embodiment, AI anomaly engine 130 is a CNN system that identifies anomaly patterns from the visualization data that is discussed in more detail herein below with reference to FIG. 2C.

Figure 2C:
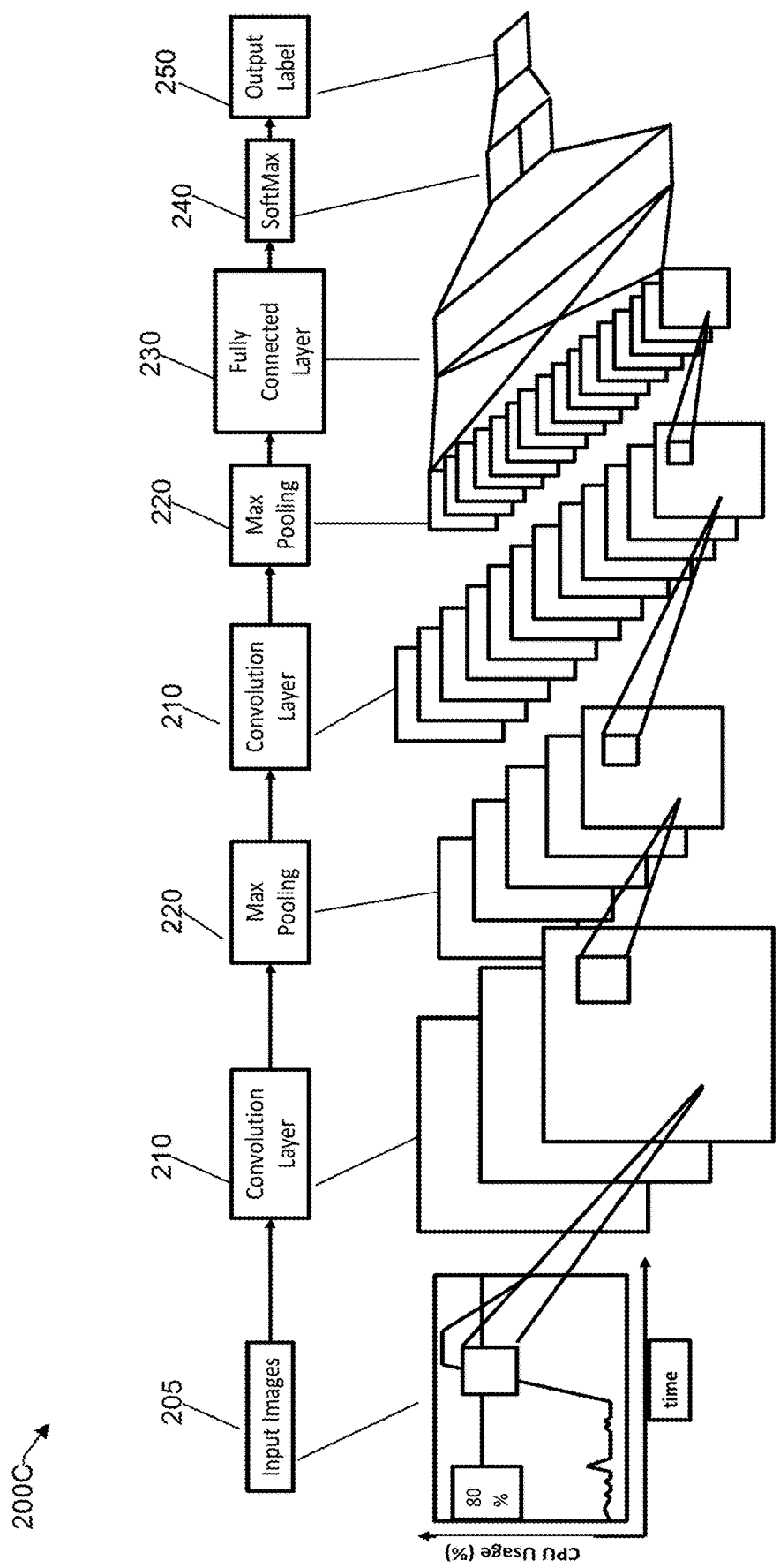
FIG. 2C illustrates an example of a pattern recognition engine that identifies anomaly patterns from visualized operational data utilizing a Convolutional Neural Network (CNN), consistent with an illustrative embodiment.

FIG. 2C shows an example of a pattern recognition engine in 200C (that can be used to implement the AI anomaly engine 130 of FIG. 1), consistent with an illustrative embodiment. In this example, a CNN model is used. Below each box of the items of the conventional neural network is a corresponding representation of the input images and alternating layers. The CNN model is a deep learning forward feed network that alternates between convolutional layers 210 and max-pooling layers 220. The CNN model is topped by a fully connected layer 230 that is a learning function of combinations of the features of the convolutional layers 210. A softmax layer 240 is used in a final layer of a neural network-based classifier, and an output label 250 can provide a classification. The input images 205 are visualization data (e.g., visualized operational data of CPU usage, storage usage, etc.) that are analyzed to identify anomaly patterns.

Referring back to FIG. 1, with regard to AI anomaly engines 130 and 135, the CNN of AI engine 130 is one of at least two kinds of deep learning used to identify anomaly patterns from the original time series data. In AI anomaly engine 135, a second kind of deep learning (e.g., an LSTM Model) that identifies anomaly patterns from the original time series data is discussed herein below.

Figure 3A:
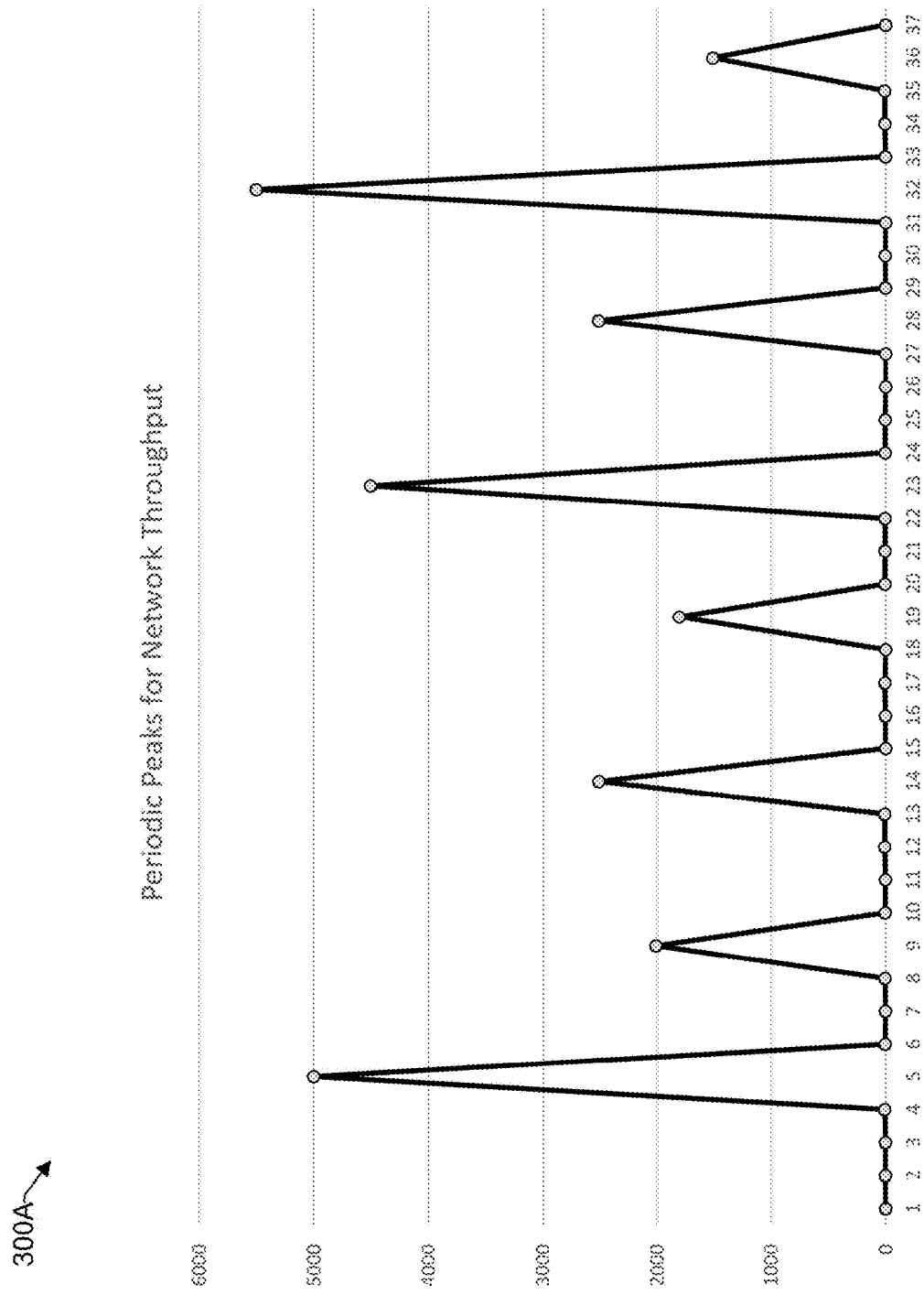

FIGS. 3A and 3B are images of periodic peaks for network throughput 300A and the natural log of the throughput 300B ((ln)throughput) generated by the Time Series Generation Engine 115 in FIG. 1) of the pattern recognition engine 125, consistent with an illustrative embodiment. AI anomaly engine 135 identifies anomaly patterns in data generated by the time series generation engine. Inside the pattern recognition engine 120 (FIG. 1), there is a feature extraction and transformation engine 125 that extracts predetermined features (e.g., "key" features) from the time series representation of the data, then using natural logs (e.g., natural log transformation) transforms the time series data to a new time series data. The new time series data is then received by AI anomaly engine 135 (e.g., an LSTM recognition engine) and anomaly patterns are captured.

Figure 3C:
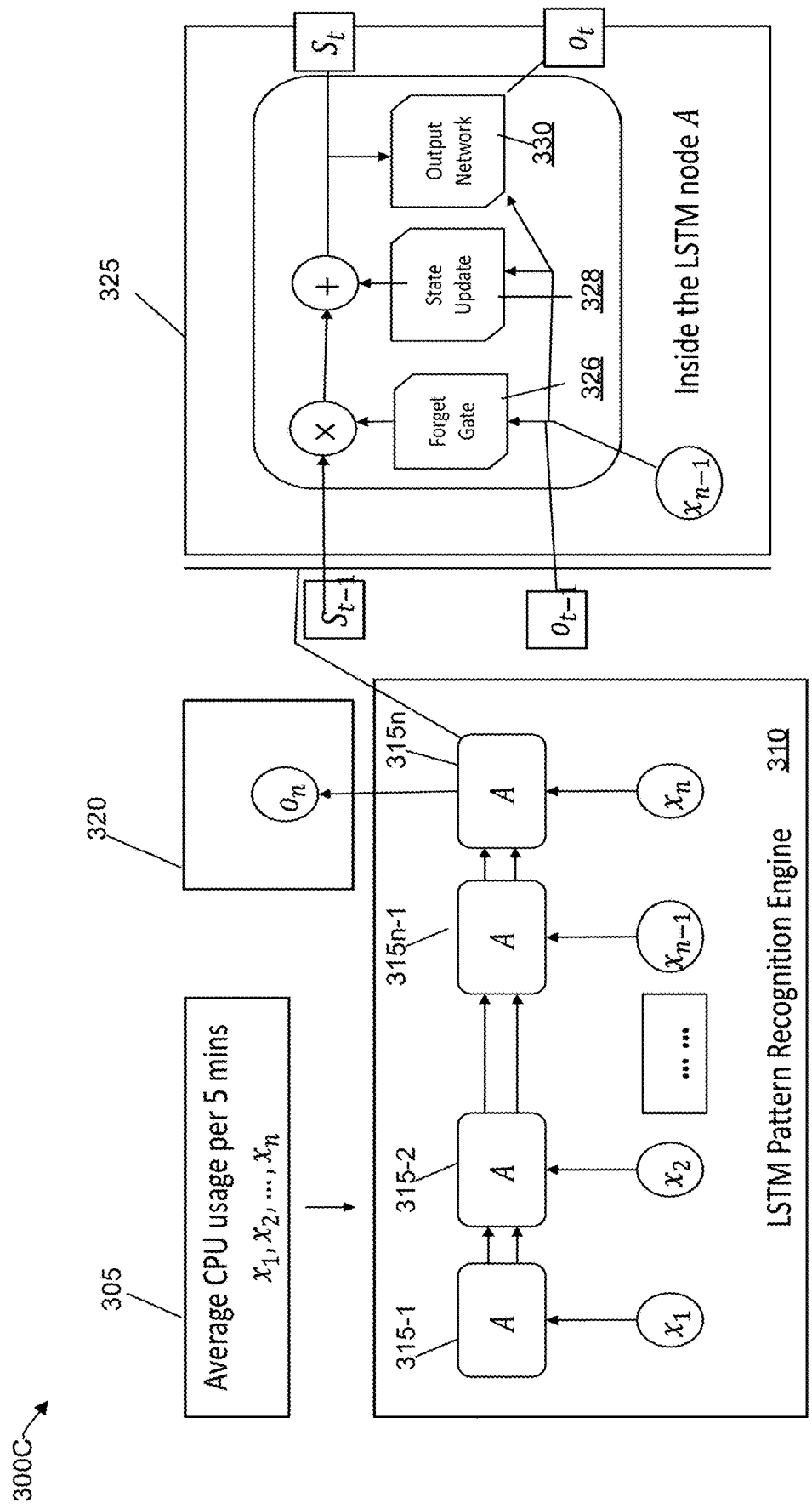
FIG. 3C is an illustration of the second AI anomaly engine of the pattern recognition engine having a Long Short-Term Memory (LSTM) model that identifies anomaly patterns from time series data, consistent with an illustrative embodiment.

FIG. 3C an example of a pattern recognition engine in 300C (that can be used to implement the second AI anomaly engine 135 of FIG. 1), consistent with an illustrative embodiment. An LSTM model identifies anomaly patterns from time series data, consistent with an illustrative embodiment. With reference to FIG. 3C, an example of operational data for illustrative purposes includes the average CPU usage per five minute intervals (305), which is input to the LSTM Pattern Recognition engine 310. A pattern of neurons 315-1, 315-2 . . . 315n-1, 315n are shown, with each neuron receiving one of the average CPU usage (x1, x2, x3) data and the output of the previous neuron 315. The LSTM Pattern Recognition engine 310 provides an output to node 320. The internal structure 325 of one of the LSTM nodes A 315-1 to 315-n is shown to the right of the LSTM Pattern Recognition Engine. It can be seen from the image of the internal structure 325 of one of the LSTM nodes A receives the state $S_{t-1}$ and output $O_{t-1}$ of the previous neuron 315. The LSTM includes a forget gate 326 to discard long term dependencies, a state update gate 328 that stores an updated state, and an output network gate 330 that provides an output of the updated state to the next neuron 315.

The output node 320 from the LSTM pattern recognition engine 310 can be connected to an input of the ensembler 140 (see FIG. 1, item 140). The ensembler 140 receives either a captured anomaly pattern or an indication that the operational data is normal from the second AI engine anomaly 135. The ensembler 140 also receives a captured anomaly pattern or an indication that the operational data is normal from the first AI anomaly engine 130, finalizes a decision as to whether there is an anomaly that has been captured in at least one AI anomaly engine 130, 135, and outputs the data to the risk assessment engine 145.

Figure 4:
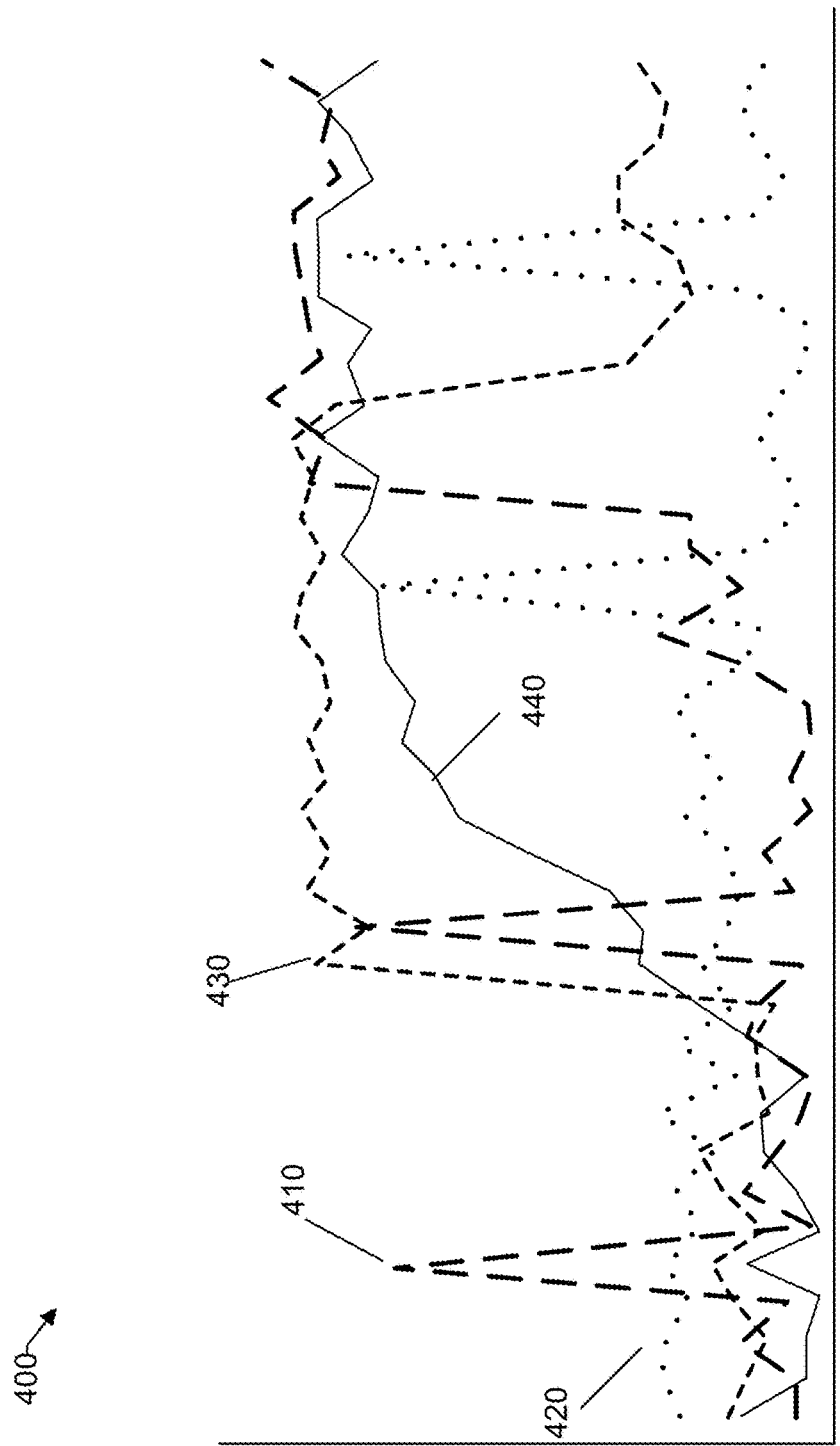
FIG. 4 illustrates an example of a problematic time series chart having anomaly patterns from time series data, consistent with an illustrative embodiment.

FIG. 4 illustrates an example of a problematic time series chart having anomaly patterns from time series data, consistent with an illustrative embodiment. FIG. 4 shows patterns of a periodic peak 410, a sudden increase 420, a sudden increase then a decrease 430, and a gradual increase 440. For example, the sudden increase then decrease 430 on the right-hand side of the graph does not return to previous levels of the left-hand side of the graph. Thus, the sudden increase then decrease 430 may be indicative of an anomaly such as a problem with a component. The gradual increase 440 may be indicative that there is, for example, an increase in storage utilization. These anomaly patterns are all assigned a risk score from the risk assessment engine 145 of FIG. 1. An IT management system may apply corrective action(s) proactively based on the risk assessment scores of the anomaly patterns to preempt a degradation or failure of an operation.

Figure 5:
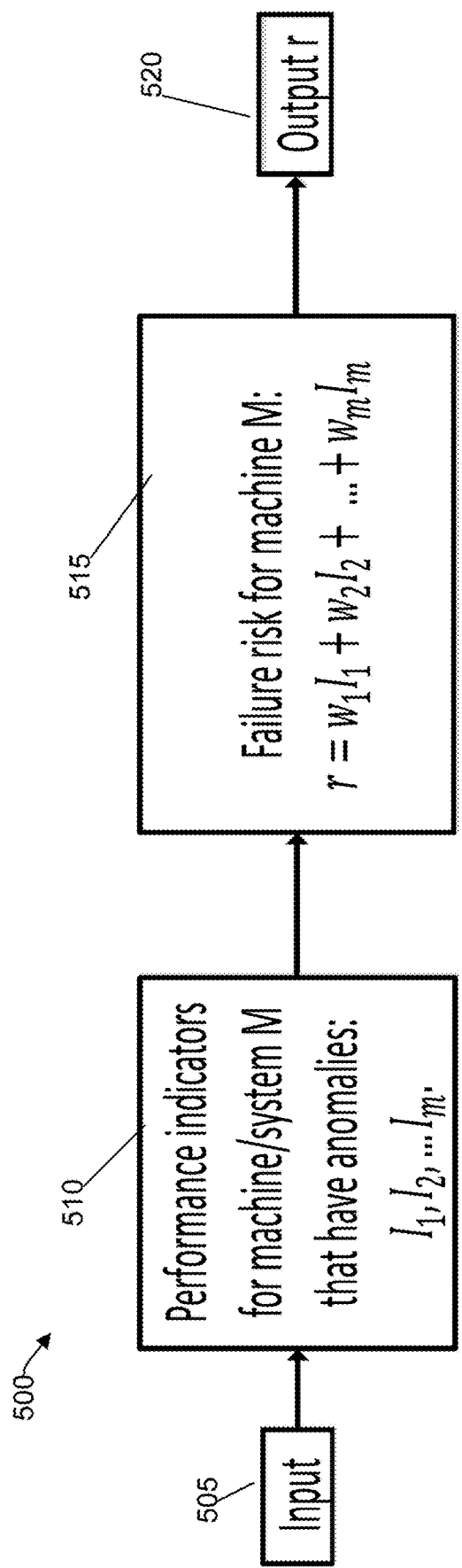
FIG. 5 is a block diagram of the operation of a risk assessment engine assigning a risk score to time series data, consistent with an illustrative embodiment.

FIG. 5 is a block diagram of the operation of a risk assessment engine 500 assigning a risk score to time series data that can be used to implement the risk assessment engine 145 of FIG. 1, consistent with an illustrative embodiment. An input 505 is received by an ensembler 140. At 510, the risk assessment engine 145 analyzes performance indicators for a machine/system M having anomalies $I_1, I_2 \ldots I_m$. At 515, the risk assessment engine calculates a failure risk for machine/system M by assigning weights (or retrieving previously assigned weights) to each type of the anomalies $I_m$. The anomalies have recognized patterns which have been previously assigned weights during a training phase, and can be arranged in a storage table. In this illustrative example, the risk is determined by Eq. 1 previously discussed herein above ($r = w_1 I_1 + w_2 I_2 + \ldots + w_m I_m$ (Eq. 1)). At output 520 the risk assessment engine 145 outputs the risk assessment to a user interface 150 of, for example, an IT service management system. The IT service management system is configured to determine whether to take corrective action in a proactive manner.

Figure 6:
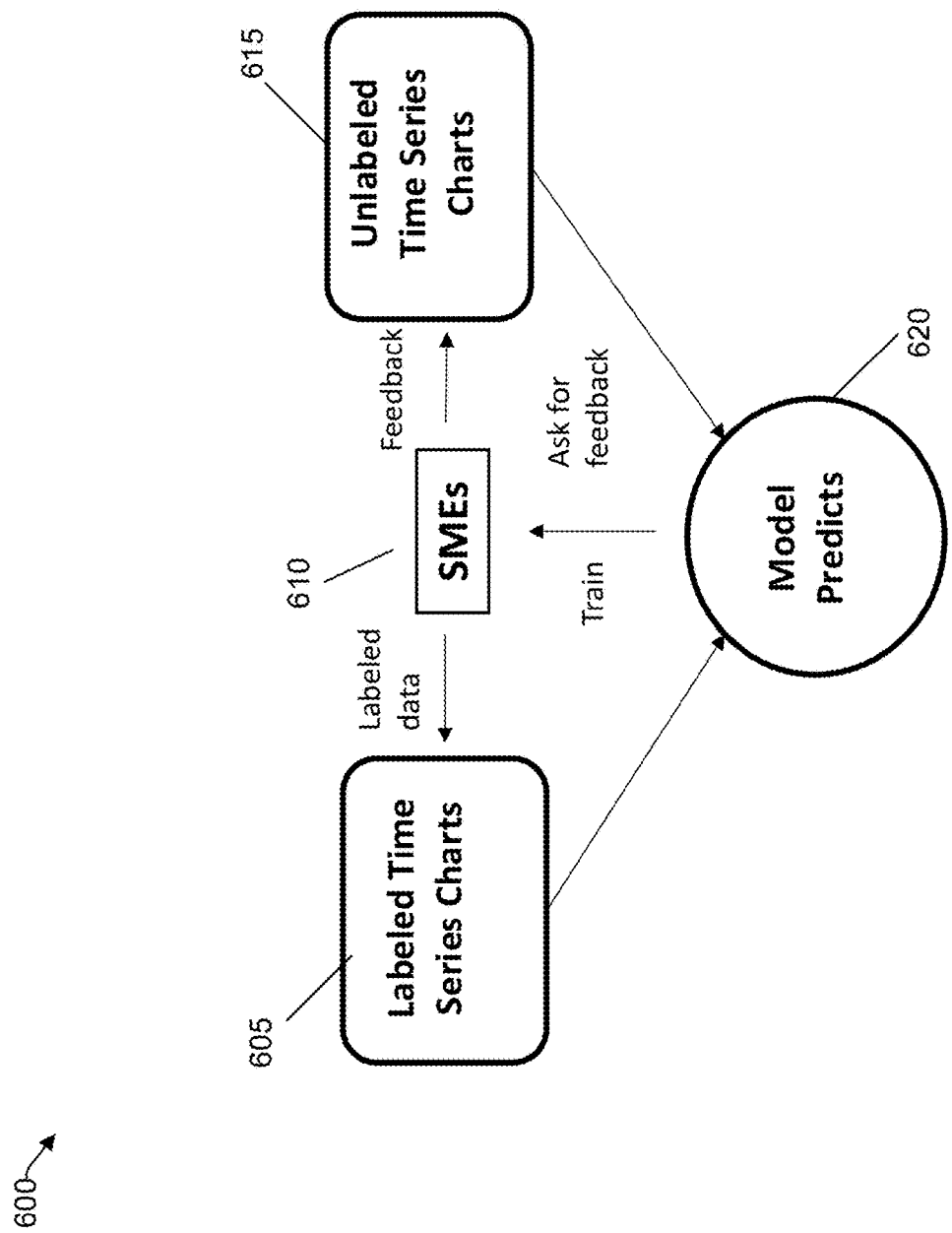
FIG. 6 is an illustration of active learning based classification for new or unrecognized visual patterns, consistent with an illustrative embodiment.

FIG. 6 illustrates a conceptual block diagram 600 of an active learning phase based classification for new or unrecognized visual patterns, consistent with an illustrative embodiment. There is shown labeled set of time series charts 605, an SME 610, and unlabeled set of time series charts 615. The labeled set of time series charts 605 is training data, which can be historical data. A multi-label classifier 620 is trained based on the training data. The multi-label classifier 620 can predict labels for the unlabeled time series charts 615 based on historical data. For example, there can be time series charts associated with historical data of previous component failures, and based on a comparison of the historical data, the multi-label classifier can predict a label that is a closest match to previously labeled time series charts, and the SME 650 can validate labels $\{l_1, l_2, \ldots, l_n\}$ for the unlabeled time series charts 615. The training data (represented by the labeled set of time series charts 605) is updated with the time series charts 605 and the validated labels $\{l_i, l_j, \ldots, l_n\}$. The multi-label classifier 620 can be retrained in the future using additional unlabeled time series charts during another active training phase.

Example Process

Figure 7:
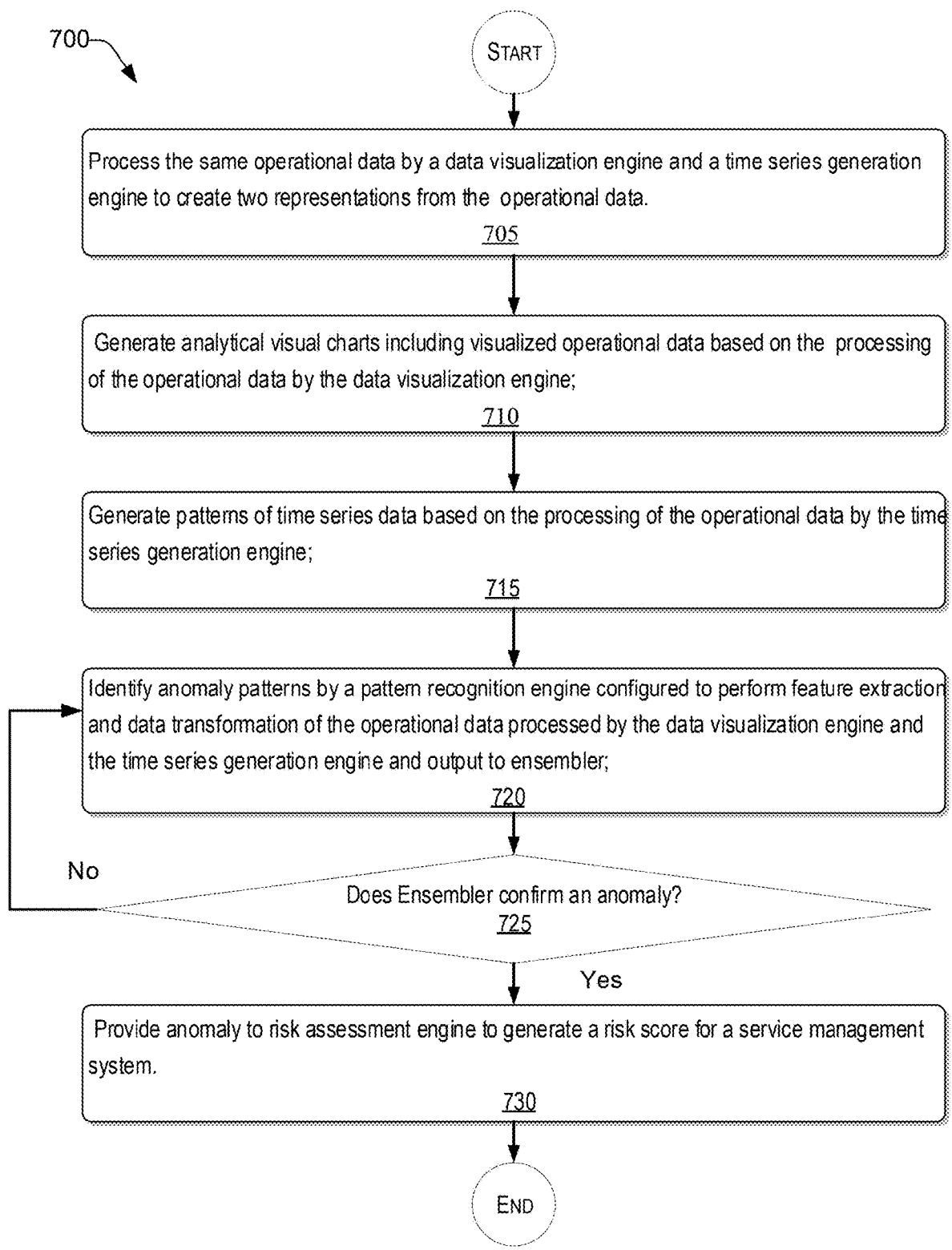
FIG. 7 is a flowchart illustrating an operation of assessing technical risk using visual pattern recognition, consistent with an illustrative embodiment.

With the foregoing overview of the example architecture 100, it may be helpful now to consider a high-level discussion of example processes. To that end, FIG. 7 presents an illustrative process related to various aspects of assessing technical risk utilizing visual pattern recognition. Process 700 is illustrated as a collection of blocks in a logical flowchart, which represent a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 700 is described with reference to the architecture 100 of FIG. 1.

FIG. 7 is a flowchart 700 illustrating an operation of assessing technical risk using visual pattern recognition, consistent with an illustrative embodiment.

At operation 705, the same operational data is processed by a data visualization engine 110 and a time series generation engine 115. The operational data may be historical data over a certain range of time for particular characteristics, such as CPU usage, storage usage, incident tickets, etc.

At operation 710, the data visualization engine 110 generates visual charts. An example of a visual chart can be a chart of peaks of CPU usage. At operation 715, patterns of time series data may be generated by the time series generation engine 115. It is to be understood that operations 710 and 715 may be performed substantially simultaneously. It is noted that a specific order is not required regarding the generation of visual charts and time series data.

At operation 720, a pattern recognition engine analyzes the data generated by each of the data visualization engine and time series generation engine to extract certain features. A Fast Fourier Transform can be used to transform the data from time space to frequency space so that an AI anomaly engine (such as AI anomaly engines 130, 135) can capture anomaly patterns.

At operation 725, an ensembler decides whether the captured patterns are in fact anomaly patterns. If the ensembler decides there are anomaly patterns, such anomaly patterns are output to the risk assessment engine to calculate a risk score for a service management system, such as a UI for an IT service management system. The IT service management system may then perform proactive operations to prevent a hard failure.

If the ensembler decides there are no anomaly patterns, the captured data may be stored, and the ensembler then will perform operation 720 on a subsequent data group output from the AI engines to determine whether there are anomaly patterns.

Example Computer Platform

Figure 8:
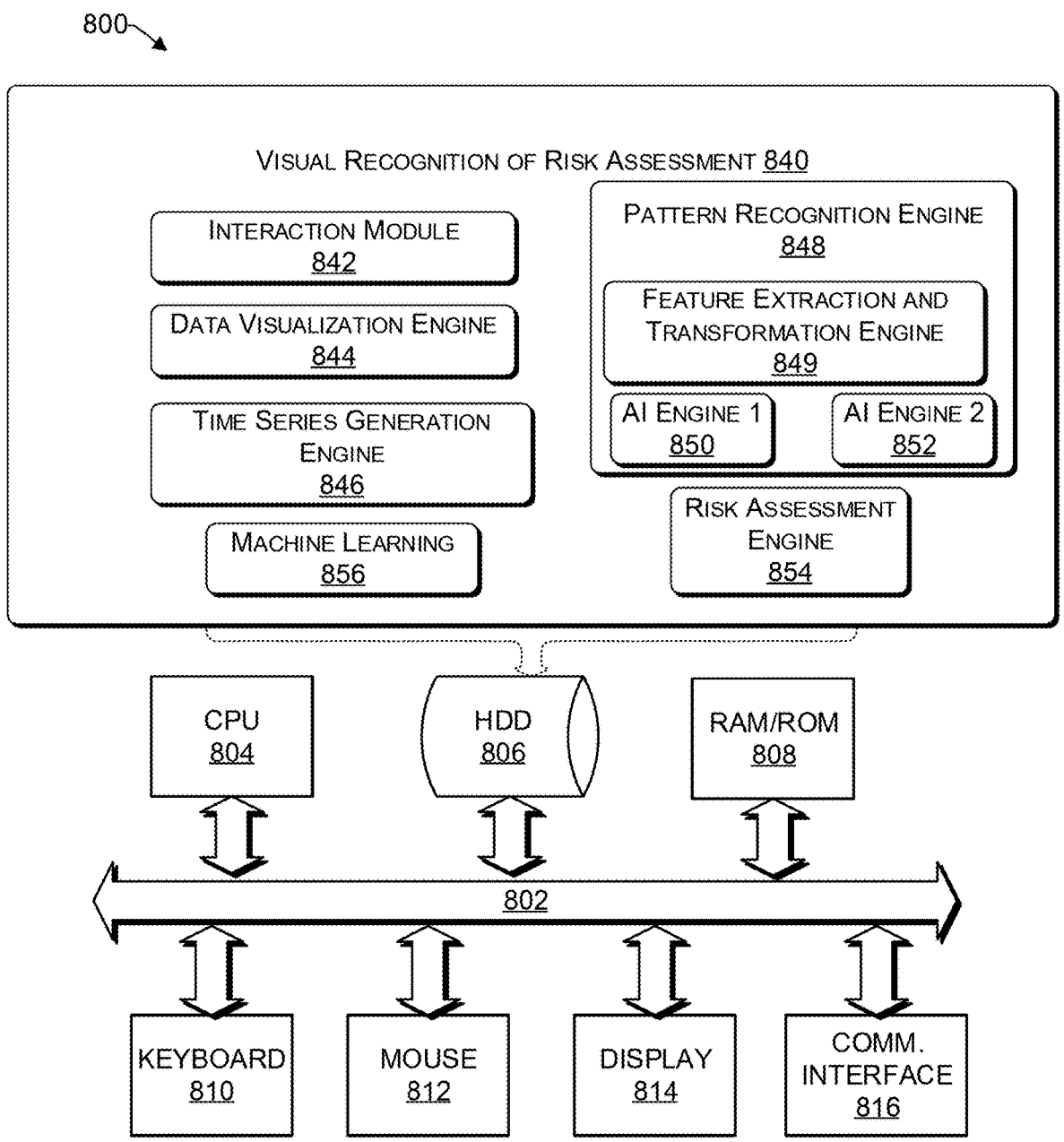
FIG. 8 is a functional block diagram illustration of a computer hardware platform that can communicate with various networked components, consistent with an illustrative embodiment.

As discussed above, functions relating to performing technical risk assessment utilizing visual pattern recognition can be performed with the use of one or more computing devices connected for data communication via wireless or wired communication, as shown in FIG. 1 and in accordance with the process shown in FIG. 7. FIG. 8 provides a functional block diagram illustration of a computer hardware platform that is capable of performing risk assessment using visual recognition, as discussed herein. In particular, FIG. 8 illustrates a network or host computer platform 800, as may be used to implement an appropriately configured server, such as an IT service management system server.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as a module for visual recognition of risk assessment 840, in a manner described herein. The Visual Recognition of Risk Assessment 840 may have various modules/sub-modules configured to perform different functions.

An interaction module 842 is operative to receive electronic data from various sources, including an operational database and data provided via cloud computing. The interaction module 842 may also be configured to present risk assessment results to a UI 150 or output 155. The data visualization engine 844 is configured to generate analytical information in the form of visual charts as discussed herein above. The time series generation engine 846 is configured to generate time series data as discussed herein above.

The pattern recognition engine 848 can include the feature extraction and transformation engine 849 to extract features output in data by the visualization and time series generation engines, 844, 846, and transform the data from time space to frequency space, for example, by performing a Fast Fourier Transform. AI anomaly Engine1 850 and AI anomaly Engine2 852 identify anomaly patterns in the transformed data of the visualization and time series generation engines, 844, 846. Risk assessment engine 854 receives the captured anomaly data (or a notification that no anomaly data was detected) from the AI anomaly Engine1 850 and the AI anomaly Engine2 852, and may output the results to, for example, the UI of an IT management server via interaction module 842.

The machine learning engine 856 is configured to train, for example, the AI anomaly Engines 850, 852 during an active training phase, and during subsequent retraining/updated training.

In one embodiment, a program, such as Apache™, can be stored for operating the system as a Web server. In one embodiment, the HDD 806 can store an executing application that includes one or more library software modules, such as those for the Java™ Runtime Environment program for realizing a JVM (Java™ virtual machine).

Example Cloud Platform

Figure 9:
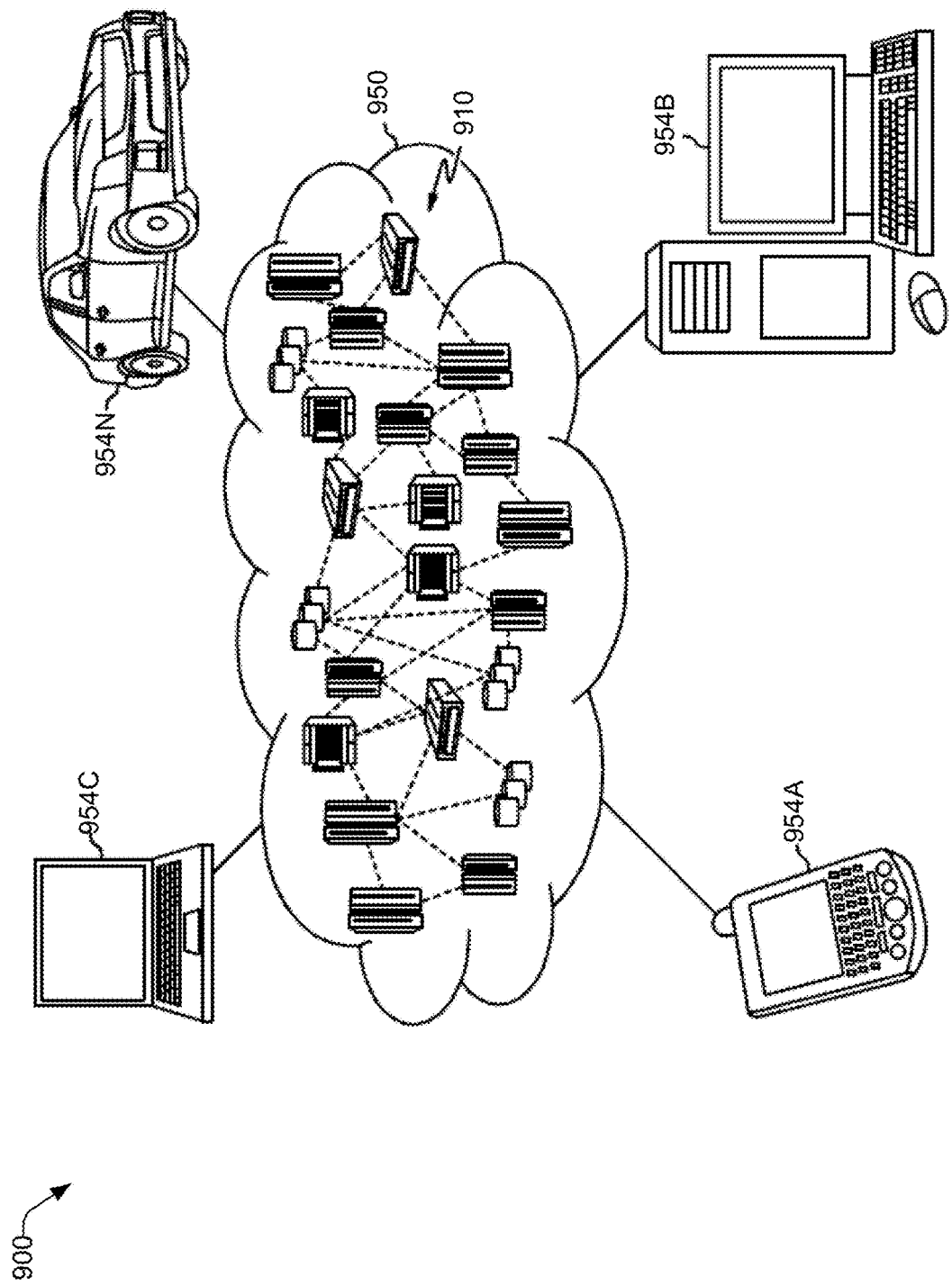
FIG. 9 depicts a cloud computing environment, consistent with an illustrative embodiment.

As discussed above, functions relating to performing technical risk assessment using visual recognition may include a cloud 900 (see FIG. 9). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, an illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
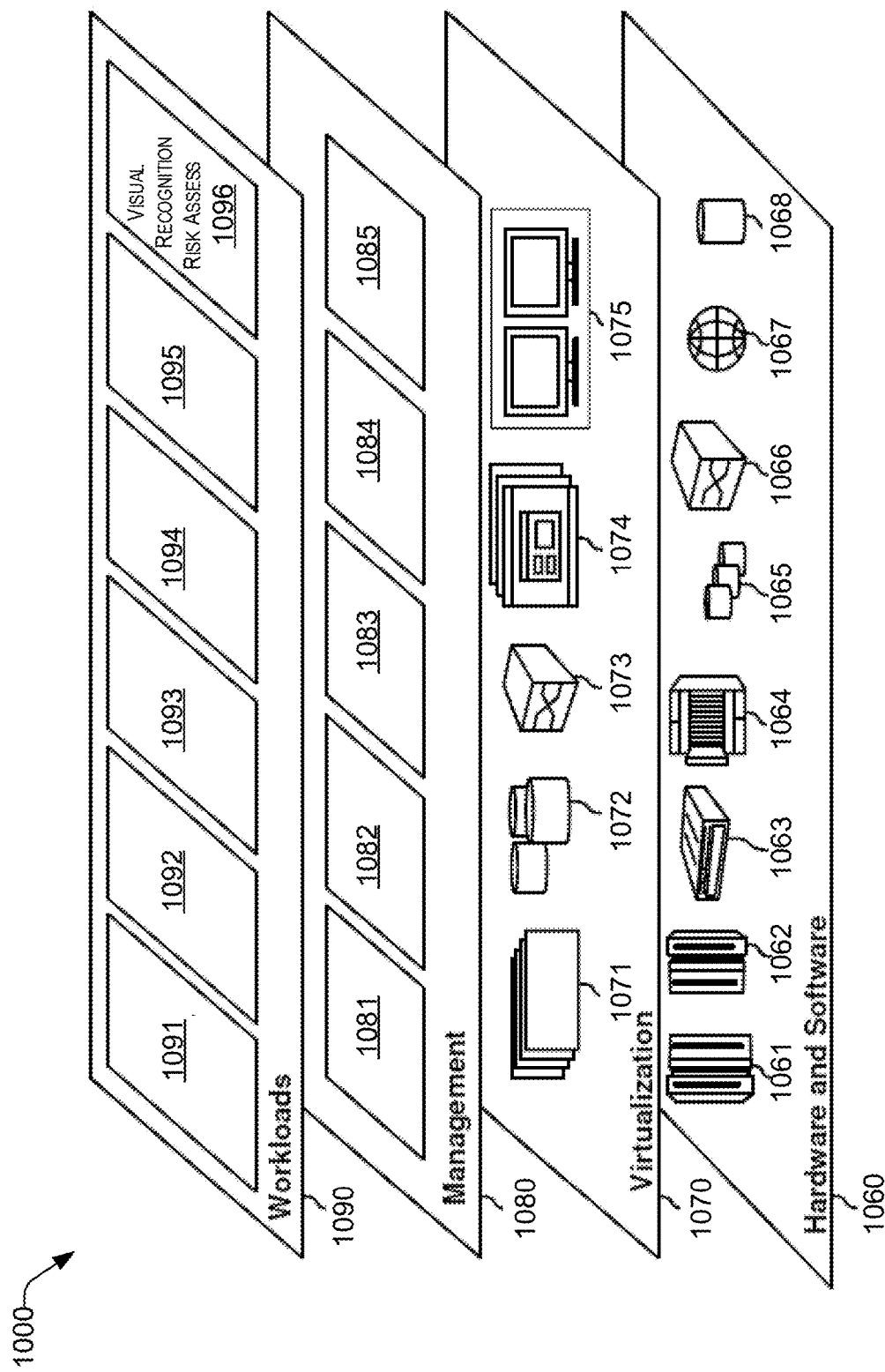
FIG. 10 depicts abstraction model layers, consistent with an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and performing technical risk assessment using visual recognition 1096, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:
1. A computing system comprising:
a processor;
a plurality of engines coupled to the processor and configured to perform acts, comprising:
receive an operational data of a system being monitored by a data visualization engine and a time series generation engine of the plurality of engines, respectively;

process the operational data by the data visualization engine to create a first representation of the operational data;

process the operational data by the time series generation engine to create a second representation of the operational data;

receive, by a pattern recognition engine of the plurality of engines, the first representation of the operational data and the second representation of the operational data, and perform feature extraction and data transformation on the respective first representation of the operational data and the second representation of the operational data;

identify respective anomaly patterns in the feature extracted and data transformed first representation and second representation of the operational data;

render, by an ensembler, a decision as to whether the identified anomaly patterns in the feature extracted and data transformed respective first and second representation of the operational data are associated with vulnerabilities of devices or components in the system being monitored; and output the decision rendered by the ensembler to an output node.

2. The computing system according to claim 1, wherein:
the first representation of the operational data comprises analytical visual charts including visualized operational data generated by the data visualization engine, and
the second representation of the operational data comprises time series data patterns generated by the time series generation engine.

3. The computing system according to claim 2, further comprising a machine learning model that is configured during a training phase to:
analyze historical patterns of analytical visual charts generated by the data visualization engine;
analyze historical patterns of time series data generated by the time series generation engine; and
receive a label of historical patterns of analytical visual charts and historical patterns of time series data as being anomalies according to predetermined criteria.

4. The computing system according to claim 1, wherein the ensembler is configured to render the decision as to whether the identified anomaly patterns are associated with vulnerabilities of devices or components in the system being monitored.

5. The computing system according to claim 4, wherein the ensemble is configured to perform a voting operation combining a largest number of classifiers associated with the anomaly patterns.

6. The computing system according to claim 5, wherein the ensembler is configured to perform the voting operation to include a weighting system that is assigned to the classifers associated with the anomaly patterns.

7. The computing system according to claim 1, further comprising a risk assessment engine configured to calculate one or more risk assessment scores associated with the vulnerabilities of devices or components in the system being monitored, wherein:
the risk assessment engine outputs the calculated one or more risk assessment scores to the output node, and
the output node comprises an Information Technology (IT) service management system.

8. The computing system according to claim 7, wherein the one or more risk assessment scores are output to a User Interface (UI) in communication with the output node.

9. The computing system according to claim 6, wherein the risk assessment engine assesses risk scores in real time utilizing the operational data processed by the data visualization engine and the time series generation engine.

10. The computing system according to claim 3, wherein:
the pattern recognition engine includes at least two artificial intelligence (AI) engines comprising:
a first anomaly AI engine comprising a convolutional neural network (CNN) system configured to identify anomaly patterns of the visualized operational data generated by the data visualization engine; and
a second AI anomaly engine comprising a Long Short-Term Memory (LS™) model configured to identify anomaly patterns from the patterns of time series data generated by the time series generation engine; and
the ensembler is configured to receive outputs of the first AI anomaly engine and the second AI anomaly engine.

11. The computing system according to claim 10, wherein, during an active phase, patterns of time series data unidentified by the first AI anomaly engine or patterns of visual analytical charts unidentified by the second AI anomaly engine are labeled during a training phase of the machine learning model and output to the pattern recognition engine.

12. The computing system according to claim 10, wherein the pattern recognition engine is configured to perform the data transformation by a Fast Fourier Transform that transforms the visual analytic charts from a time space to a frequency space.

13. A non-transitory computer readable storage medium tangibly embodying a computer readable program code having computer readable instructions that, when executed, causes a computer device to carry out a method of assessing technical risk using visual pattern recognition and pattern recognition of time series data, the method comprising:
processing an operational data of a system being monitored by a data visualization engine and a time series generation engine, respectively, to create two representations from the operational data;
generating, by the data visualization engine, a first representation of the operational data comprising analytical visual charts including visualized operational data;
generating, by the time series generation engine, a second representation of the operational data comprising patterns of time series data;
identifying, by a pattern recognition engine, anomaly patterns in the first representation of the operational data and the second representation of the operational data, respectively;
rendering a decision as to whether the identified respective anomaly patterns in the first representation of the operational data and the second representation of the operational data are associated with vulnerabilities of devices or components in the system being monitored; and
outputting the decision to an output node.

14. The non-transitory computer readable storage medium of claim 13, further comprising:
calculating, by a risk assessment engine, one or more risk assessment scores associated with the vulnerabilities of devices or components in the system being monitored, based on anomaly patterns in the first representation of the operational data and the second representation of the operational data, respectively; and outputting the one or more risk assessment scores to an Information Technology (IT) service management system.

15. The non-transitory computer readable storage medium of claim 14, wherein:
the pattern recognition engine includes a first artificial intelligence (AI) anomaly engine comprising a convolutional neural network (CNN) system, and a second AI anomaly engine comprising a Long Short-Term Memory (LSTM) model;
the identifying of anomaly patterns of the visualized operational data generated by the data visualization engine is performed by the first AI engine; and
the identifying of anomaly patterns from the time series data generated by the time series generation engine is performed by the second AI engine.

16. The non-transitory computer readable storage medium of claim 15, further comprising: receiving, by an ensembler, outputs of the first AI anomaly engine and the second AI anomaly engine, wherein the ensembler is further configured to render a decision as to whether the outputs of the first AI anomaly engine and the second AI anomaly engine comprise anomaly patterns associated with the vulnerabilities of devices or components in the system being monitored, based on a voting operation combining a largest number of classifiers associated with the anomaly patterns.

17. The non-transitory computer readable storage medium of claim 13, wherein:
the pattern recognition engine is configured to perform feature extraction and data transformation of the first representation of the operational data by the data visualization engine, and the second representation of the operational data by the time series generation engine, and
the pattern recognition engine performs the data transformation by at least one of a Fast Fourier Transform, binning, or normalization.

18. A computer-implemented method of risk assessment utilizing visual pattern recognition, the computer-implemented method comprising:
receiving an operational data by a data visualization engine and a time series generation engine;
generating, by the data visualization engine, visual analytic charts of the operational data;
generating, by the time series generation engine, a time series representation of the operational data;
performing, by a pattern recognition engine, feature extraction and data transformation on the visual analytic charts and the time series representation of the operational data;
identifying, by a first Artificial Intelligence (AI) anomaly engine including a convolutional neural network system, anomaly patterns from the visualized analytic charts;
identifying, by a second AI anomaly engine including a Long Short-Term Memory (LSTM) model, anomaly patterns from the time series representation of the operational data;
receiving, by an ensembler, outputs of the first AI anomaly engine and the second AI anomaly engine and rendering a decision as to whether the outputs of the first AI anomaly engine and the second AI anomaly engine comprise anomaly patterns associated with vulnerabilities of device or components in a system being monitored;
rendering, by a risk assessment engine that receives the decision from the ensembler, risk scores associated with the identified vulnerabilities of devices or components in an Information Technology service management system; and
outputting the risk scores to a user interface (UI).

19. The computer-implemented method according to claim 18, wherein:
the pattern recognition engine identifies the anomaly patterns using a first representation and a second representation of the same operational data, respectively,
the performing of feature extraction and data transformation on the visual analytic data and the time series data includes at least one of a dimensionality reduction, a Fast Fourier Transformation of the visual analytic data and the time series representation of the operational data, or calculating a natural logarithm of the operational data.

20. The computer-implemented method according to claim 19, further comprising configuring a machine learning model during a training phase to:
analyze historical patterns of analytical visual charts generated by the data visualization engine;
analyze historical patterns of time series data generated by the time series generation engine; and
receive a label of historical patterns of analytical visual charts and historical patterns of time series data as being anomalies according to predetermined criteria.

* * * * *